United States Patent
Westerweck

(10) Patent No.: US 6,879,446 B1
(45) Date of Patent: Apr. 12, 2005

(54) VIEWFINDER MECHANISM

(75) Inventor: Lothar Westerweck, Hollywood, FL (US)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 10/704,338

(22) Filed: Nov. 7, 2003

(51) Int. Cl.$^7$ .......................... G02B 15/14; G03B 13/20
(52) U.S. Cl. ...................... 359/696; 396/143; 359/694
(58) Field of Search .................. 359/694, 696, 359/703, 704, 823; 396/139, 143

(56) References Cited

U.S. PATENT DOCUMENTS

| | | | | |
|---|---|---|---|---|
| 2,746,350 A | * | 5/1956 | Hopkins | 359/679 |
| 3,750,548 A | * | 8/1973 | Engelsmann et al. | 396/202 |
| 5,636,062 A | * | 6/1997 | Okuyama et al. | 359/700 |
| 5,864,719 A | * | 1/1999 | Hirohata | 396/82 |
| 5,886,830 A | * | 3/1999 | Oono et al. | 359/696 |

* cited by examiner

Primary Examiner—Ricky Mack
(74) Attorney, Agent, or Firm—Scott L. Lampurt; Kerry Sisselman

(57) ABSTRACT

A viewfinder mechanism is provided for use with a zoom lens system. The viewfinder mechanism includes a set of pivoting levers driven by the linear motion of the zoom lens. In one particular embodiment, the pivoting levers drive the viewfinder lenses to approximate an apparent zoom corresponding to that performed by the zoom lens system.

25 Claims, 9 Drawing Sheets

VIEWFINDER MECHANISM

FIELD OF THE INVENTION

The present invention relates to image capture devices and more particularly, to the viewfinder for a zoom optical system for an image capture device.

BACKGROUND OF THE INVENTION

In a camera having an optical zoom lens, there is a problem of correlating the zoom effect undergone by the zoom lens with the scene shown to the user through an optical viewfinder.

What is needed is a viewfinder for a zoom optical system that can be accurately correlate the zoom of the zoom lens to the magnification of the scene experienced by the user.

SUMMARY OF THE INVENTION

A viewfinder mechanism is provided for use with a zoom lens system. The viewfinder mechanism includes a set of pivoting levers driven by the linear motion of the zoom lens. In one particular embodiment, the pivoting levers drive the viewfinder lenses to approximate an apparent zoom corresponding to that performed by the zoom lens system.

Other particular features and embodiments will become apparent from the following detailed disclosure of the invention.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred, it being understood however, that the invention is not limited to the specific methods and instrumentality's disclosed. Additionally, like reference numerals represent like items throughout the drawings. In the drawings.

DETAILED DESCRIPTION OF THE PREFERRED EMBODIMENTS

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

A viewfinder mechanism is provided for use with a zoom lens system. The viewfinder mechanism includes a set of pivoting levers driven by the linear motion of the zoom lens. In one particular embodiment, the pivoting levers drive the viewfinder lenses to approximate an apparent zoom corresponding to that performed by the zoom lens system.

Figure 1A:
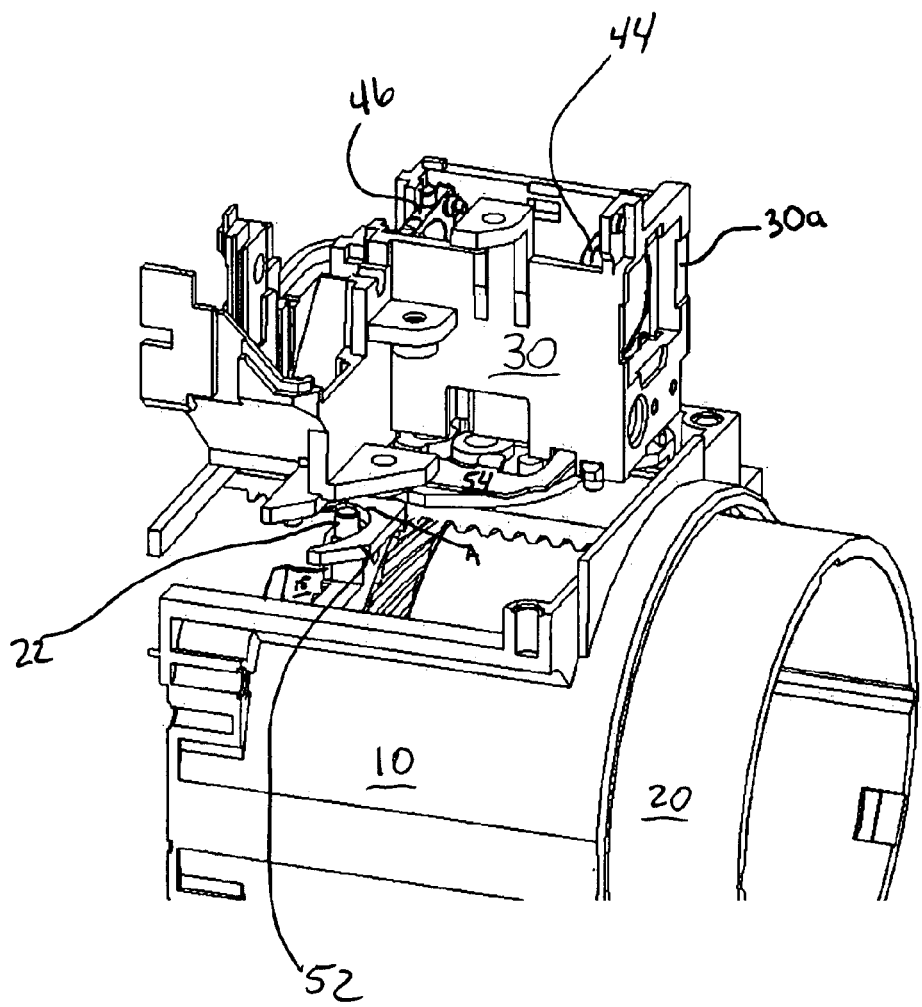
FIG. 1A is a partial isometric view of a zoom lens system, shown in the wide position, including a zooming viewfinder mechanism in accordance with one particular embodiment of the present invention.
Figure 1B:
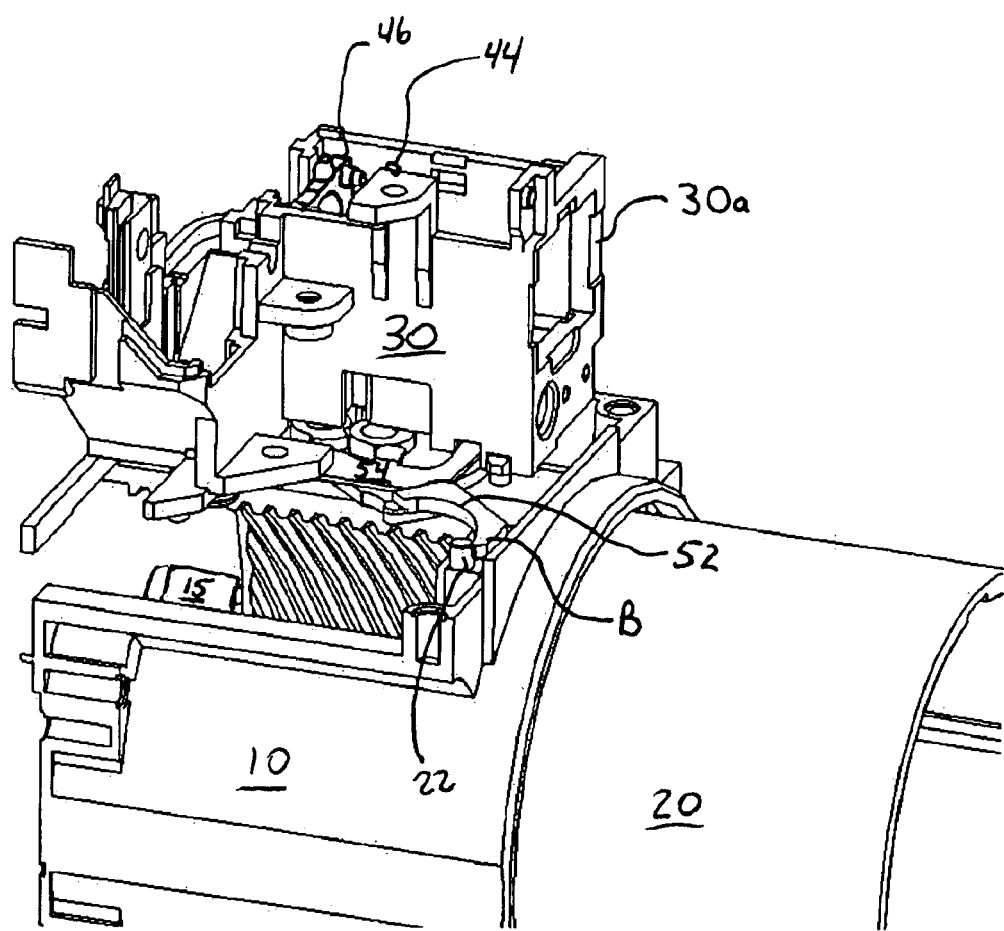
FIG. 1B is a partial isometric view of the zoom lens system of FIG. 1A, shown in the tele position.

Referring now to FIGS. 1A and 1B, there is shown a zoom lens system that includes a viewfinder mechanism in accordance with one particular embodiment of the present invention. The zoom lens system includes a stationary or fixed lens box 10 and a rotating zoom lens barrel 20, which linearly extends from and retracts into the fixed lens box 10. As the rotating lens barrel 20 is advanced, a front lens barrel (not shown) located concentrically within the lens barrel 20, additionally advances due to its relationship with the lens barrel 20. An activation pin 22, linked to the front lens barrel (not shown), additionally advances and retracts in coordination with the advancement and retraction of the lens barrel 20. More specifically, as the lens barrel 20 advances linearly out of the fixed lens box 10, the activation pin 22 advances within the fixed lens box 10 a corresponding amount, as shown in FIGS. 1A and 1B. The zoom lens barrel 20 and the ring 21 (FIG. 2) upon which activation pin 22 is carried are driven by a motor (15 of FIG. 1B) and its affiliated gear train.

Figure 2:
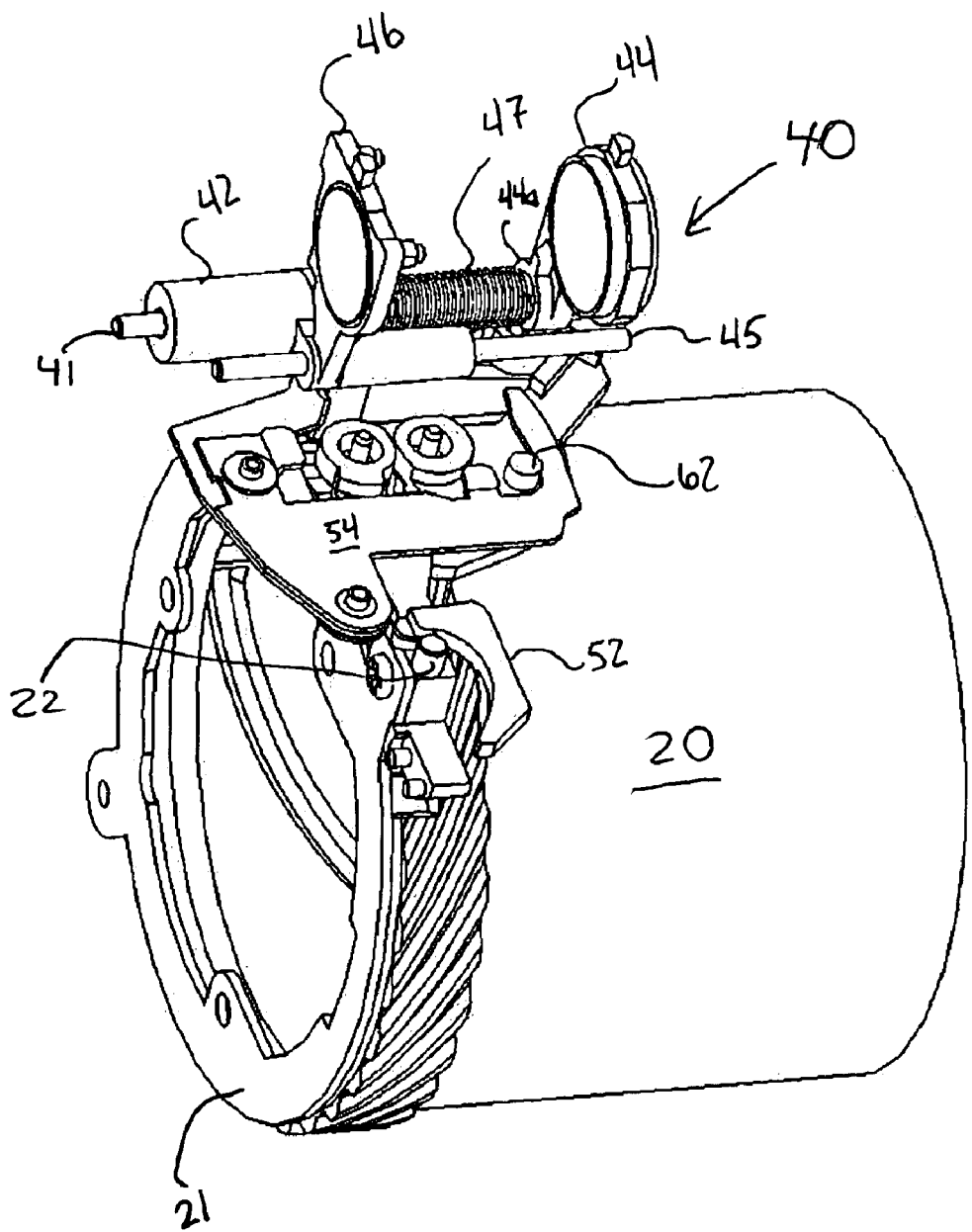
FIG. 2 is an isometric view in the wide position of a zooming viewfinder mechanism in accordance with one particular embodiment of the present invention demonstrating its interaction with the lens barrel of a zoom lens system.
Figure 3A:
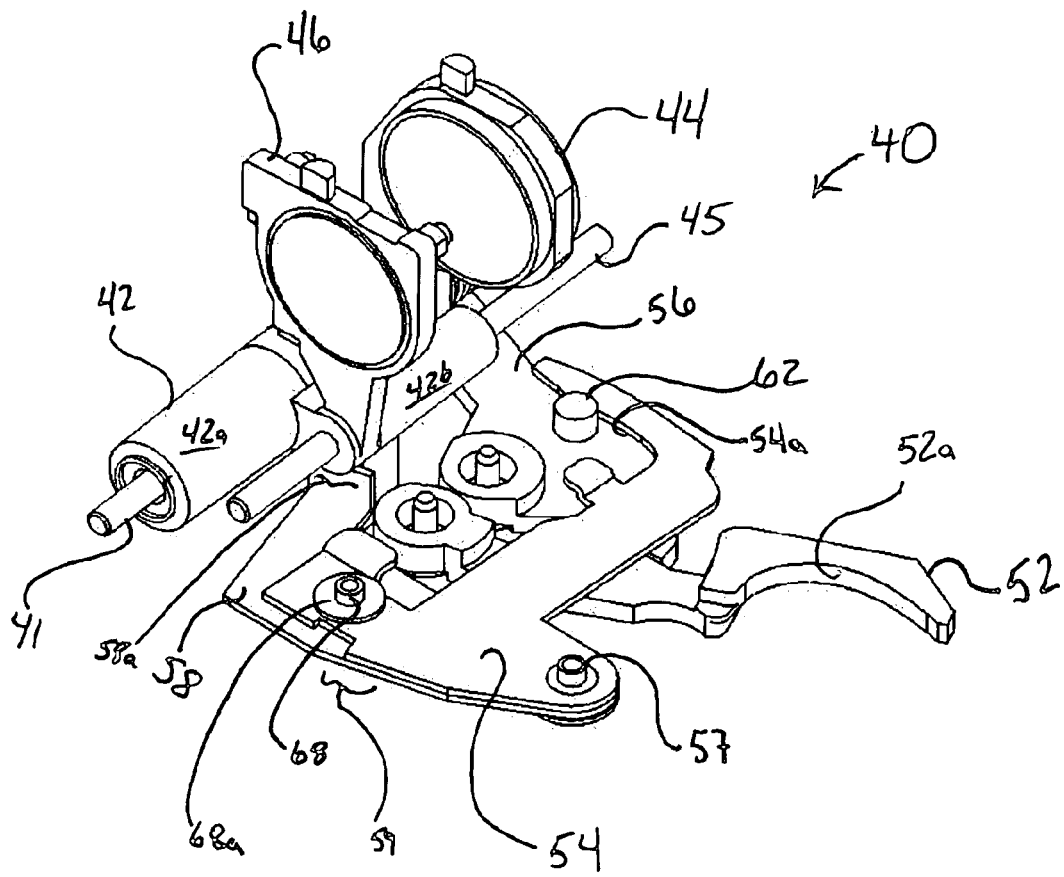
FIG. 3A is an isometric view taken from the top of a viewfinder mechanism in accordance with one particular embodiment of the present invention.
Figure 3B:
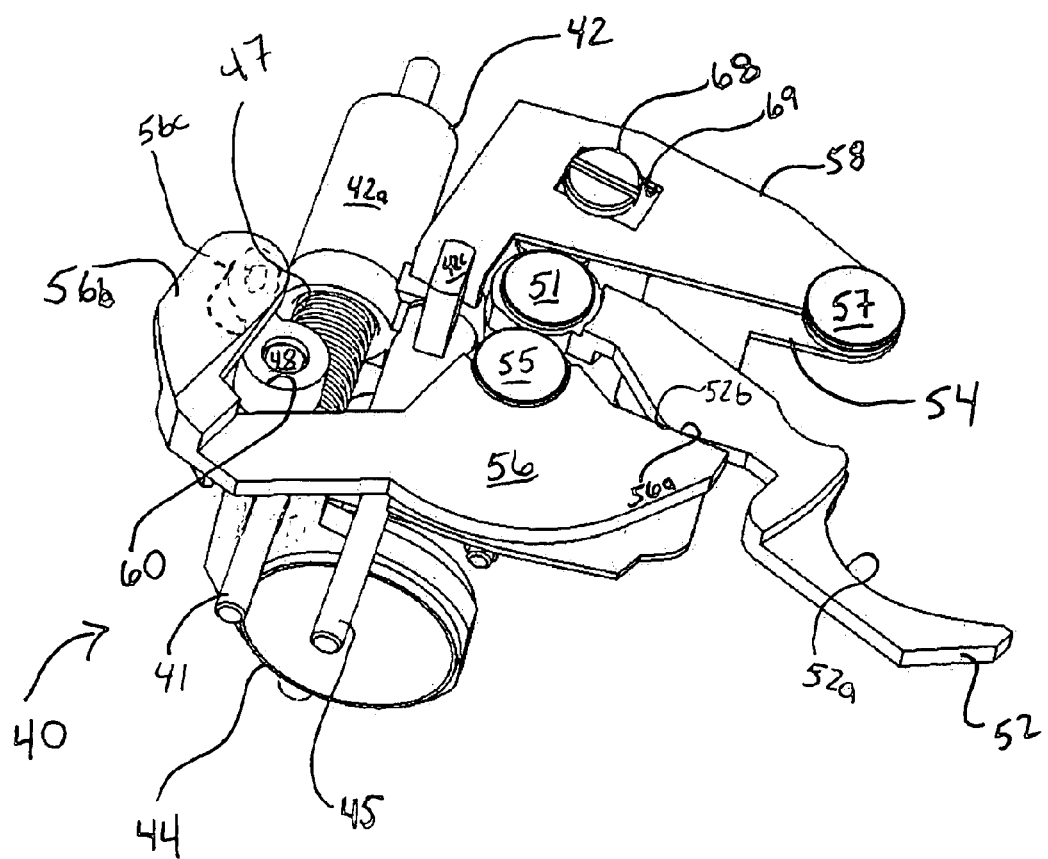
FIG. 3B is an isometric view taken from the bottom of the viewfinder mechanism of FIG. 2.
Figure 4:
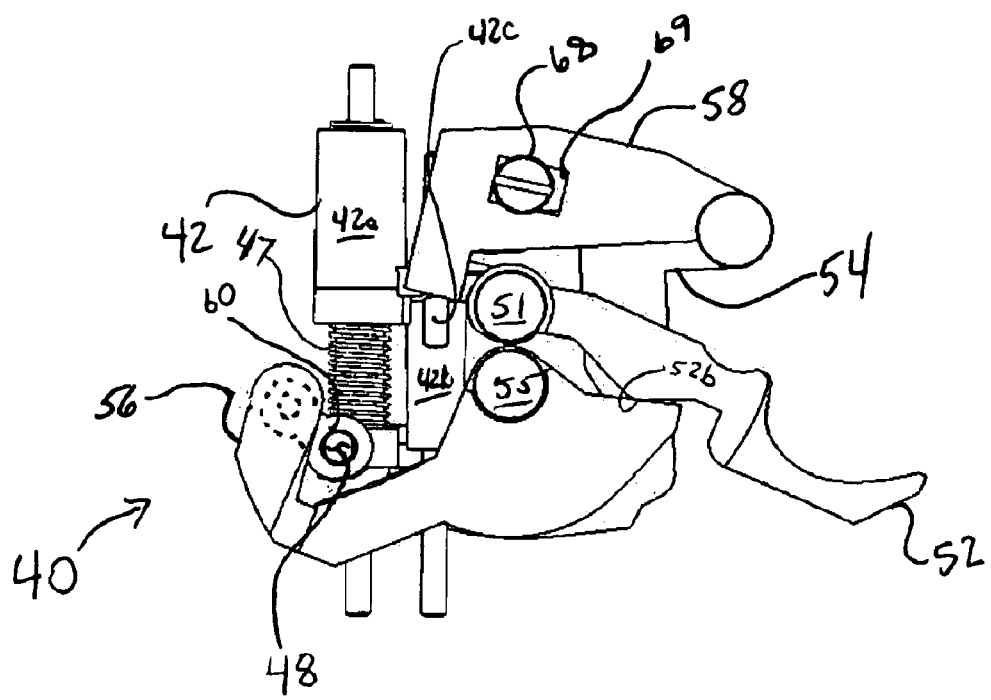
FIG. 4 is a bottom elevational view of the viewfinder mechanism of FIG. 2.
Figure 5:
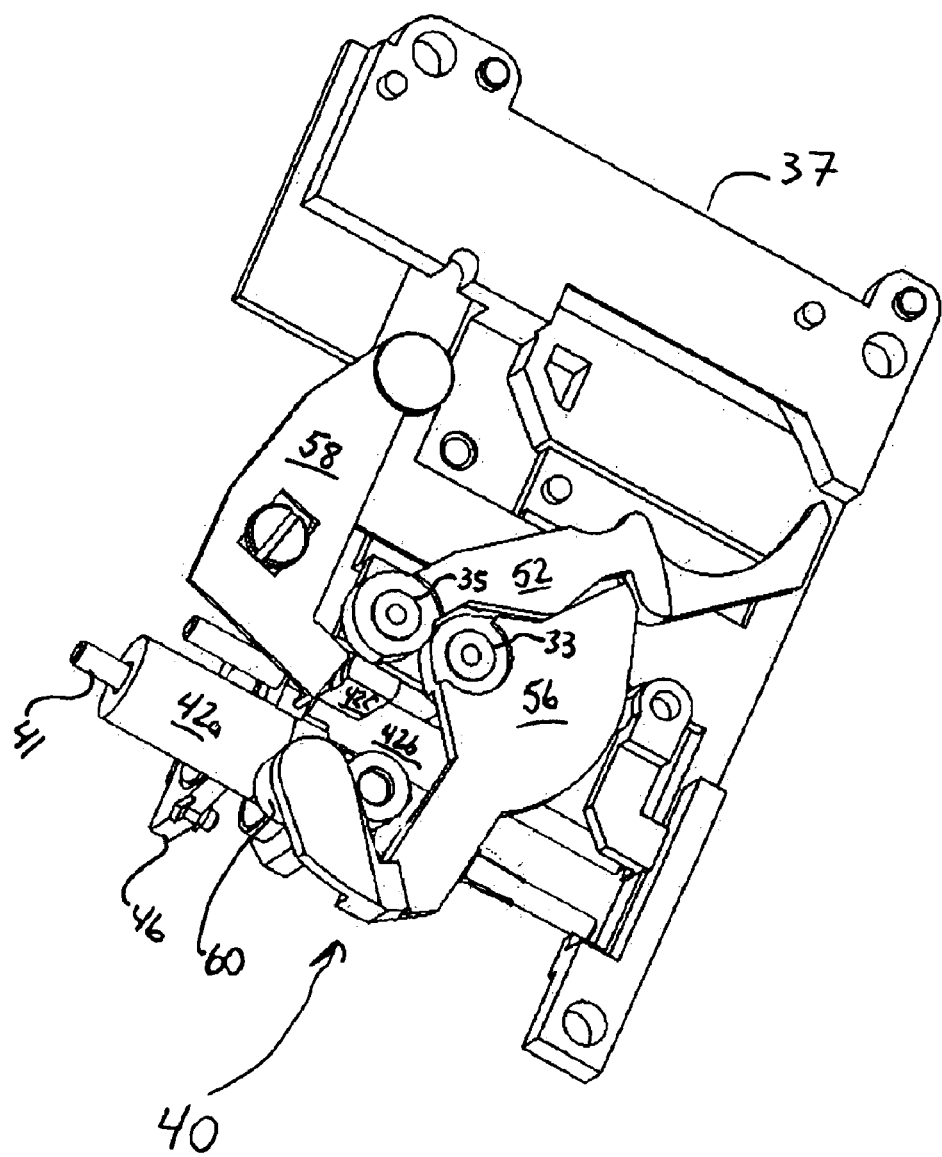
FIG. 5 is a bottom isometric view of the viewfinder mechanism of FIG. 3B affixed to a viewfinder holder board.
Figure 6:
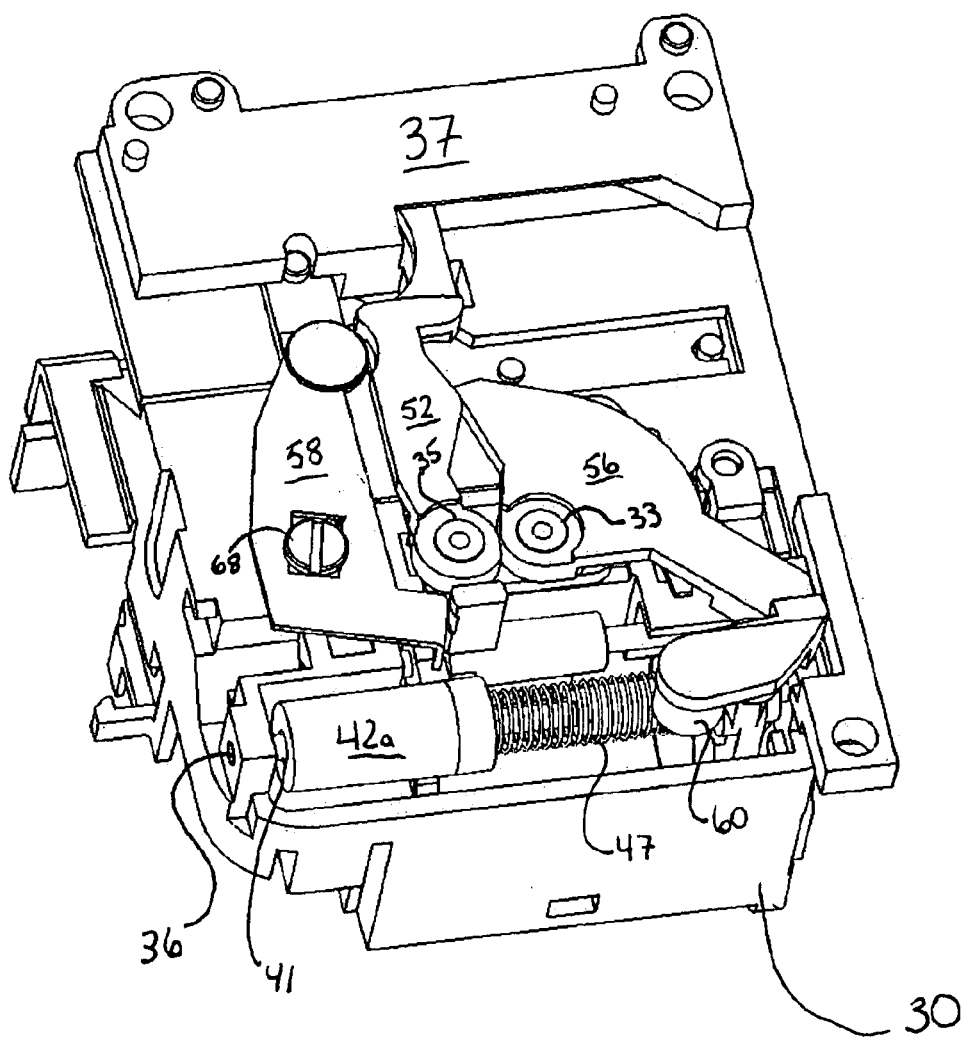
FIG. 6 is a bottom isometric view of the viewfinder mechanism contained in a viewfinder housing in accordance with one embodiment of the present invention.

Further, a viewfinder housing 30, containing a viewfinder mechanism, is fixed to the stationary lens box 10, or to another stationary portion of the image capture device. Attached between the viewfinder housing 30, the fixed lens box 10 and a viewfinder base or holder board (37 of FIG. 5), is the viewfinder mechanism (40 of FIG. 2). In FIG. 2, there is shown just the viewfinder mechanism 40 in the wide position, interacting normally with the lens barrel 20, via activation pin 22.

Referring more specifically to FIGS. 1–7, the viewfinder mechanism 40 includes the rear viewfinder lens 46 and the middle viewfinder lens 44, the movement of which relative to each other and to a fixed front viewfinder lens (not shown) approximate the zooming effect accomplished by the zoom lenses in the zoom lens system. The front viewfinder lens (not shown) is fixed to the front face 30a of the viewfinder housing 30.

Lenses 44 and 46 are fixed to holder portions 44a and 42, respectively, which are slideably mounted to the guide pins 41 and 45. More specifically, the rear lens 46 is fixed to the lens holder 42, which includes holder portions 42a and 42b. Guide pins 41 and 45 pass through the holder portions 42a and 42b, respectively, to stabilize the rear viewfinder lens 46. The middle viewfinder lens 44 is fixed to a holder 44a, which is mounted on the guide pin 41.

The rear and middle viewfinder lenses 44, 46 are normally biased apart from each other by compression spring 47. Compression spring 47 is mounted coaxially around the guide pin 41, between and in contact with the holder portions 42a and 44a. Although a compression spring is shown, it can be seen how the spring 47 can be implemented using other types and configurations of springs to maintain a desired relationship between the lenses 44 and 46.

As will be described herebelow, the lenses 44, 46 of the viewfinder mechanism 40 is driven by the levers 52, 54 and 59 (the combined lever formed by lever portions 56 and 58), in coordination with each other and with two pins, rear viewfinder pin 62 and activation pin 22. The viewfinder mechanism 40 may be fixed to a viewfinder holder board (37 of FIG. 5) prior to mounting the entire assembly into the viewfinder housing 30.

Moving the Middle Viewfinder Lens

The method and apparatus for moving the middle viewfinder lens 44 will now be described. The middle viewfinder lens 44 is pulled linearly over the guide rail 41 by a bearing connector 60, which translates the rotational motion of the middle lens lever 56, and the activation lever 52, in response to the direct linear movement of the lens barrel 20 and activation pin 22.

More specifically, the viewfinder activation lever 52 is pivotally connected around a cylindrical bearing surface (35 of FIG. 6) of the viewfinder holder board 37. The activation lever 52 is secured to the bearing surface 35 and board 37 by the pivot pin 51. The free end of the viewfinder activation lever 52 includes a cam surface 52a that has been shaped in accordance with a calculation that places the middle viewfinder lens 44 at each of a plurality of desired positions based on the position of the zoom taking lens. The cam surface 52a is engaged with the activation pin 22 that advances linearly with the rotatable lens barrel 20. When the activation pin 22 is moved with the advancement or retraction of the rotatable lens barrel 20, the activation lever 52 is rotated by the contact between the activation pin 22 and the cam surface 52a.

As the lens barrel 20 advances from the wide position shown in FIG. 1A to the tele position shown in FIG. 1B, it can be seen that the activation pin 22 is advanced from a zoom start position "A" along the cam surface 52a, to an end position "B". Correspondingly, as the activation pin 22 moves from "A" to "B", the activation lever 52 is correspondingly rotated. Although only two positions are shown in FIGS. 1A and 1B, during operation of the zoom lens system, a driving mechanism of the lens barrel 20 is programmed to stop at a plurality of discrete positions. The activation pin 22, correspondingly, is stopped at a plurality of points along the cam surface 52a of the activation lever 52 each of which correlates to a desired position of the front viewfinder lens 44.

A projection or radius portion 52b of the viewfinder activation lever 52 additionally contacts a straight surface 56a of the middle lens lever 56. The middle lens lever 56 is additionally pivotally connected around a cylindrical bearing surface (33 of FIG. 6) of the viewfinder holder board 37. The lever 56 is secured to the bearing surface 33 and board 37 by the pivot pin 55. As the activation pin 22 drives the viewfinder activation lever 52, the middle lens lever 56 moves in the same direction, based on the interaction between the radius portion 52b and the straight surface 56a.

The middle lens lever 56 additionally includes at its free end 56b, a pin 56c. The middle lens 44, likewise includes a pin 48 (in shadow) on the frame portion thereof A "figure eight" shaped bearing connector 60 (a portion of which is shown in shadow in FIGS. 3B and 4), is connected between the pin 56c and the pin 48. The bearing connector 60 translates rotational motion of the middle lens lever 56 into linear motion of the middle lens 44 by pulling the middle viewfinder lens 44. The ability of the bearing connector 60 to accommodate for the sideways motion of the pivoting lever 56, ensures a smooth, linear movement of the middle lens 44 along the guide rail 45, preventing a more jerking movement. As the middle lens lever 56 rotates, the middle lens 44 moves between the wide angle and telephoto positions, opposite the motion of the lens barrel 20.

Moving the Rear Viewfinder Lens

The method and apparatus for moving the rear viewfinder lens 46 will now be described. The viewfinder mechanism 40 additionally includes a rear lens lever 59 formed from the rear lens lever portion 54 and the rear lens adjustment lever portion 58. The rear lens lever 59 is pivotally fixed to the viewfinder mechanism 40 by a pivot pin 57. A pin 62 located on the middle lens lever 56 drives one free end of the rear lens lever 59. The second free end of the rear lens lever 59 includes a finger 58a engaged with a spur 42c on the rear lens mounting portion 42b. By biasing the mounting portion 42a, and correspondingly the mounting portion 42b, spring 47 additionally biases the spur 42c against the finger 58a at all times, even during rotation of the rear lens lever 59.

More specifically, the middle lens lever 56 includes a pin 62 in communication with a cam surface 54a on the rear lens lever portion 54. As the middle lens lever 56 rotates in response to rotation of the activation lever 52, interaction between the pin 62 and cam surface 54a results in the rear lens lever 59 pivoting around its own pivot pin 57. The motion of the rear lens lever 59 is determined by the cam profile of the cam surface 54a and by the amount of movement of the pin 62 of the middle lever 56. This results in the spring-loaded, rear viewfinder lens 46 being moved to a desired back focal lens position based on the position of the finger 58a of the rear lens lever 59. Additionally, the surface of the finger 58a is angled so that it will push the rear viewfinder lens 46 simultaneously forward and sideways to prevent a jerking movement of the rear viewfinder lens 46.

Tuning the Viewfinder Mechanism During Assembly

Additionally, in one particular embodiment shown in the figures, the relationship between the rear lens lever 59, the rear viewfinder lens 46 and the middle lens lever's pin 62 can be fine tuned. In the present particular embodiment, the rear lens lever portion 54 and the rear lens adjustment lever portion 58 share the same pivot pin 57, which enables the two lever portions 54, 58, to initially rotate relative to each other. An adjustment pin 68 riveted through the rear lens lever portion 54 and the rear lens lever adjustment portion 58, fixes the two portions relative to each other to form the rear lens lever 59. Adjustment pin 68 is located through the pin slot 69 and a corresponding hole of the lens lever portion 54.

Figure 7:
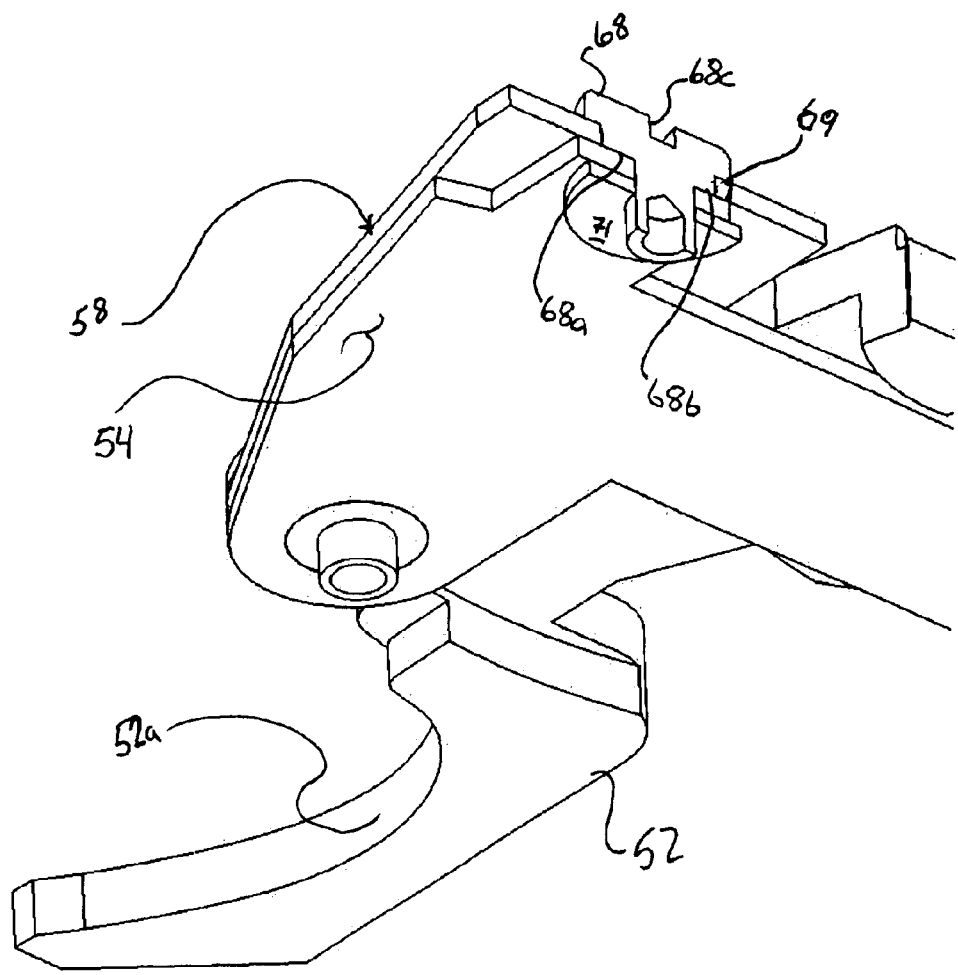
FIG. 7 is a partial, cross sectional view of a viewfinder mechanism in accordance with one particular embodiment of the present invention.

As shown more particularly in FIG. 7, the adjustment pin 68 includes a circular collar formed eccentric with the shaft of the pin 68, as demonstrated in the cross sectional view taken perpendicular to the slot 68c, by the portions 68a and 68b having a radius at the collar portion 68a greater than the radius at the collar portion 68b. The slot 69 is sized to receive the collar portion therein, while the bottom surface of the collar portion is flush with the surface of the rear lens lever portion 54.

Using a screwdriver in the slot 68c of the adjustment pin 68, the pin 68 may be rotated to move the rear lens adjustment portion 58 relative to the rear lens portion 54. More specifically, rotation of the adjustment pin 68 causes the collar to push against the wall of slot 69, resulting in a rotary motion of the portions 54 and 58 relative to each other. As shown in FIG. 7, the collar is sized to contact one wall of the slot 69 at a time. As such, rotating the adjustment pin 68 in either direction brings the collar into contact with either of the sidewalls of the slot 69 and, thus can adjust the position of the portions 54, 58 relative to each other in two directions. Once the rear lens adjustment portion 58 and the rear lens lever portion 54 are at a desired position relative to each other, that position is fixed merely by removing the screwdriver and discontinuing the turning of the adjustment pin 68. After which, the adjustment pin 68 is held against unwanted rotation by friction (in the present embodiment, by the use of a washer 71).

If desired, an adhesive may be used in addition to the adjustment pin 68, to more permanently fix the rear lens lever adjustment portion 58 to the rear lens lever portion 54 at the optimal position. This particular adjustment enables the viewfinder mechanism 40 to be fine tuned to compensate for back focal length variations between the rear viewfinder lens 46 and the middle viewfinder lens 44. The entire viewfinder mechanism 40 can be adjusted using this method, prior to finally fixing the fully assembled viewfinder mechanism 40 in the housing 30 to the fixed lens box 10.

As can be seen from the descriptions above, any particular desired relationship between the image capture device zoom lens system and the apparent zoom of the viewfinder mechanism 40 may be achieved by choosing appropriate profiles for the activation lever cam surface 52*a* and the rear lens lever cam surface 54*a*.

The present invention may additionally be implemented using additional lenses and/or elements. In one particular implementation of the presently described viewfinder mechanism, a viewfinder ocular lens (not shown) may be separated from the rear viewfinder 46 lens by a series of mirrors and/or prisms that further enlarge the optical path of the viewfinder.

As described above, in the present invention, the viewfinder lenses 44, 46 are driven linearly by a series of interrelated pivoting levers, which themselves are driven by the linear advance or retraction of the image capture device's zoom lens barrel.

While the invention has been described with reference to certain embodiments, it will be understood by those skilled in the art that various changes may be made and equivalents may be substituted for elements thereof without departing from the scope of the invention. For example, wherein a riveted pin is described in connection with the adjustment pin 68, in another embodiment, a screw or other fixation device could be used. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A viewfinder assembly, comprising:
   a first viewfinder lens;
   a second viewfinder lens aligned optically with said first viewfinder lens;
   a driving lever in communication with said first viewfinder lens;
   a second lens lever in communication with said second viewfinder lens and with said driving lever;
   a drive mechanism for moving said driving lever; and
   wherein movement of said driving lever moves said first viewfinder lens and said second lens lever, and wherein movement of said second lens lever moves said second viewfinder lens.

2. The viewfinder assembly of claim 1, wherein said drive mechanism includes an activation pin linked to a zoom lens barrel and said driving lever includes a cam surface in contact with said activation pin, wherein said activation pin is moved with said zoom lens barrel, wherein movement of said activation pin moves said driving lever.

3. The viewfinder assembly of claim 2, wherein said driving lever comprises an activation lever secured to the viewfinder assembly at a first pivot point and a first lens lever secured to the viewfinder assembly at a second pivot point, wherein rotation of said activation lever around said first pivot point causes said first lens lever to rotate around said second pivot point and move said first viewfinder lens.

4. The viewfinder assembly of claim 3, wherein said activation lever includes a radius portion in contact with said first lens lever, such that rotation of said activation lever causes said radius portion to rotate said first lens lever.

5. The viewfinder assembly of claim 4, wherein said first lens lever is connected to said first viewfinder lens by a bearing connector that translates rotational movement of said a first lens lever into linear motion of said first viewfinder lens.

6. The viewfinder assembly of claim 3, wherein said first viewfinder lens and said second viewfinder lens are normally biased relative to each other by a spring.

7. The viewfinder assembly of claim 2, wherein said driving lever includes a cam pin and said second lens lever includes a cam surface in contact with said cam pin, such that motion of said driving lever moves said pin along said cam surface.

8. The viewfinder assembly of claim 7, wherein said second lens lever comprises a cam portion and an adjustment portion, wherein said cam portion and said adjustment portion are movable relative to eachother.

9. The viewfinder assembly of claim 8, wherein said cam portion and said adjustment portion are pivotally connected to each other by a pivot pin and wherein said second lens lever further includes an adjustment pin, a portion of which is located through said cam portion and said adjustment portion to fix said cam portion and adjustment portion relative to each other.

10. The viewfinder assembly of claim 9, wherein one of said cam portion and said adjustment portion includes a slot therethrough and wherein said adjustment pin includes a head portion, a pin portion extending from said head portion and a collar portion fixed eccentrically around a portion of said pin adjacent to said head portion, said collar being located in said slot, wherein rotation of said adjustment pin moves said cam portion relative to said adjustment portion.

11. The viewfinder assembly of claim 10, wherein said driving lever comprises an activation lever secured to the viewfinder assembly at a first pivot point and a first lens lever secured to the viewfinder assembly at a second pivot point, wherein rotation of said activation lever around said first pivot point causes said first lens lever to rotate around said second pivot point and move said first viewfinder lens.

12. An image capture device, comprising:
   a zoom lens system, including,
      a fixed lens box
         at least one zoom lens barrel located within and extendible from said fixed lens box,
      an activation pin located within said fixed lens box and moved with said at least one zoom lens barrel, and
      a drive mechanism for driving said at least one zoom lens barrel, and a viewfinder assembly, including,
   a first viewfinder lens;
   a second viewfinder lens aligned optically with said first viewfinder lens;
   a driving lever in communication with said first viewfinder lens at a first end and said activation pin at a second end, wherein movement of said activation pin moves said driving lever;
   a second lens lever in communication with said second viewfinder lens and with said driving lever; and
wherein movement of said driving lever moves said first viewfinder lens and said second lens lever, and wherein movement of said second lens lever moves said second viewfinder lens.

13. The image capture device of claim 12, wherein said driving lever comprises an activation lever secured to the viewfinder assembly at a first pivot point and a first lens lever secured to the viewfinder assembly at a second pivot point, wherein rotation of said activation lever around said first pivot point causes said first lens lever to rotate around said second pivot point and move said first viewfinder lens.

14. The viewfinder assembly of claim 13, wherein said second lens lever comprises a cam portion and an adjustment portion pivotally connected to each other by a pivot pin and an adjustment pin, a portion of which is located through said cam portion and said adjustment portion to fix said cam portion and adjustment portion relative to each other.

15. The viewfinder assembly of claim 14, wherein one of said cam portion and said adjustment portion includes a slot therethrough and wherein said adjustment pin includes a head portion, a pin portion extending from said head portion and a collar portion fixed eccentrically around a portion of said pin adjacent to said head portion, said collar being located in said slot, wherein rotation of said adjustment pin moves said cam portion relative to said adjustment portion.

16. A viewfinder assembly, comprising:
   a first viewfinder lens;
   a second viewfinder lens aligned optically with said first viewfinder lens;
   an activation lever secured to the viewfinder assembly at a first pivot point, said activation lever including a cam portion;
   a first lens lever secured to the viewfinder assembly at a second pivot point, said first lens lever being mounted in contact with a portion of said first lens lever;
   a drive mechanism in communication with said cam portion for moving said activation lever; and
   wherein said drive mechanism causes said activation lever to rotate around said first pivot point, which causes said first lens lever to rotate around said second pivot point and move said first viewfinder lens.

17. The viewfinder assembly of claim 16, wherein said drive mechanism includes an activation pin linked to a zoom lens barrel in contact with said cam surface and wherein said activation pin is moved with said zoom lens barrel.

18. The viewfinder assembly of claim 17, wherein said activation lever includes a radius portion in contact with said first lens lever, such that rotation of said activation lever causes said radius portion to rotate said first lens lever.

19. The viewfinder assembly of claim 16, additionally including a second lens lever in communication with said second viewfinder lens, wherein movement of said second lens lever moves said second viewfinder lens.

20. The viewfinder assembly of claim 19, wherein said second viewfinder lens is additionally in communication with one of said activation lever and said first lens lever, such that movement of said activation lever results in movement of said second lens lever.

21. The viewfinder assembly of claim 20, wherein said second lens lever includes a second cam portion and said first lens lever includes a cam pin in communication with a portion of said second cam portion.

22. The viewfinder assembly of claim 21, wherein said second lens lever further includes an adjustment portion, wherein said second cam portion and said adjustment portion are movable relative to eachother.

23. A method of assembling the optics in an image capture device including a zoom lens system, comprising:
   (a) providing a viewfinder assembly, comprising:
      a first viewfinder lens;
      a second viewfinder lens aligned optically with said first viewfinder lens;
      a driving lever in communication with said first viewfinder lens;
      a second lens lever in communication with said second viewfinder lens and driven by a portion of said driving lever, wherein said second lens lever comprises a cam portion and an adjustment portion pivotally connected to each other by a pivot pin; and
      an adjustment pin, a portion of which is located through said cam portion and through said adjustment portion to fix said cam portion and adjustment portion relative to each other, and wherein one of said cam portion and said adjustment portion includes a slot therethrough and wherein said adjustment pin includes a head portion, a pin portion extending from said head portion and a collar portion fixed eccentrically around a portion of said pin adjacent to said head portion, said collar being located in said slot, wherein rotation of said adjustment pin moves said cam portion relative to said adjustment portion
   (b) rotating said adjustment pin in said slot to adjust said cam portion relative to said adjustment portion, to fine tune said second viewfinder lens position to compensate for back focal length variations between said second viewfinder lens and said first viewfinder lens.

24. The method of claim 23, additionally including the step of,
   (c) fixing said viewfinder assembly to the image capture device in a fixed relationship with the zoom lens system after step (b), wherein said driving lever is moved by a portion of said zoom lens system.

25. The method of claim 24, wherein said driving lever, comprises an activation lever secured to said viewfinder assembly at a first pivot point and a first lens lever secured to said viewfinder assembly at a second pivot point, wherein rotation of said activation lever around said first pivot point causes said first lens lever to rotate around said second pivot point and move said first viewfinder lens.

* * * * *